(12) United States Patent
Ogata et al.

(10) Patent No.: US 6,660,981 B2
(45) Date of Patent: Dec. 9, 2003

(54) INDUCTION COOKING DEVICE WITH DISPLAY

(75) Inventors: Taizo Ogata, Kobe (JP); Kenji Hattori, Kobe (JP); Yuuji Fujii, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/181,012

(22) PCT Filed: Jan. 12, 2001

(86) PCT No.: PCT/JP01/00170
§ 371 (c)(1), (2), (4) Date: Sep. 18, 2002

(87) PCT Pub. No.: WO01/52603
PCT Pub. Date: Jul. 19, 2001

(65) Prior Publication Data
US 2003/0057200 A1 Mar. 27, 2003

(30) Foreign Application Priority Data
Jan. 13, 2000 (JP) .......................................... 2000-004286
Jan. 31, 2000 (JP) .......................................... 2000-021637

(51) Int. Cl.$^7$ .............................. H05B 6/06; H05B 6/12
(52) U.S. Cl. ...................... 219/622; 219/624; 219/627; 219/663; 219/667; 219/506; 99/325
(58) Field of Search .............................. 219/622, 623, 219/624, 627, 625, 626, 667, 663, 506, 402, 407, 413, 414; 99/451, 325

(56) References Cited

U.S. PATENT DOCUMENTS 4,667,074 A * 5/1987 Kubo et al. ................. 219/627
4,833,288 A * 5/1989 Poumey ....................... 219/624

FOREIGN PATENT DOCUMENTS

| JP | 2-114487 | 4/1990 |
|----|----------|--------|
| JP | 3-114182 | 5/1991 |
| JP | 5-258847 | 10/1993 |
| JP | 6-76933 | 3/1994 |
| JP | 7-254482 | 10/1995 |
| JP | 7-312279 | 11/1995 |
| JP | 10-149876 | 6/1998 |
| JP | 10-162948 | 6/1998 |
| JP | 10-284244 | 10/1998 |
| JP | 11-214139 | 8/1999 |

* cited by examiner

Primary Examiner—Philip H. Leung
(74) Attorney, Agent, or Firm—Snell & Wilmer, LLP

(57) ABSTRACT

An induction-heating cooking device includes: an insulating plate which is partially or entirely light-transmissive, and on which an object to be heated is placed; a heating coil provided under the insulating plate, for heating the object to be heated; a display section for indicating a portion to be heated by the heating coil through the insulating plate; and an output control section for controlling electrical conduction to the heating coil, wherein the display section includes a light emitting section which is provided in the vicinity of a magnetic flux generated by the heating coil, and the light emitting section is laid and connected radially along a radial direction of the heating coil for indicating a portion to be heated by the heating coil.

6 Claims, 13 Drawing Sheets

Prior Art

INDUCTION COOKING DEVICE WITH DISPLAY

TECHNICAL FIELD

The present invention relates to an induction-heating cooking device incorporating an inverter for household or business use.

BACKGROUND ART

In a conventionally developed induction-heating cooking device, as a structure for indicating a portion of the cooking device which is to be heated by a heating coil, light emitting elements, such as LEDs, are installed in the vicinity of the outer perimeter of the heating coil. The LEDs are lighted according to need, such that the portion to be heated is indicated through an insulating plate having light transmissivity.

A conventional heating cooking device 1000 is described with reference to FIG. 10. The heating cooking device 1000 includes: a heating coil table 101; a heating coil 102 provided on the heating coil table 101; a light-transmissive insulating plate 103 provided above the heating coil 102; and output control means 104 which controls electrical conduction to the heating coil 102. The heating cooking device 1000 further includes display means 106 provided at the outer perimeter of the heating coil 102. The display means 106 includes light emitting elements 105. The light emitting elements 105 indicates the position of the heating coil 102 through the insulating plate. As shown in FIG. 10, a plurality of LEDs, which are provided as the light emitting elements 105, are connected by wirings 1001 so as to form an electric serial circuit. The wirings 1001 are provided along the outer perimeter of the heating coil 102.

Heating cooking devices developed in recent years, which use an inverter and to which the principles of induction heating and dielectric heating are applied, have good heating responsivity and heating controllability. In such a cooking device, a temperature detecting element, a weight sensor, and the like, are provided in the vicinity of a position where a pan or food (load) is to be placed, for detecting the temperature of the pan or food and the weight of the food. Adjustment of the power of heat and adjustment of the cooking time are performed according to the detected temperatures and weight, whereby elaborate cooking can be achieved. Further, although fire is not used, a high thermal efficiency is still obtained, and additionally such a cooking device does not substantially pollute air in a room, but can be used safely and maintained to be clean. Such characteristics have received attention, and the demand for such cooking devices has been sharply increasing.

Furthermore, in such a heating cooking device using an inverter, electrical and thermal stresses imposed on a switching element are reduced, whereby the price of the cooking device is decreased, and the reliability of the cooking device is increased. Especially in a multiple-burner induction-heating cooking device, in order to avoid the generation of interference noise generated between pans placed on adjacent burners, the same, constant operation frequency is used for both these burners, and an inverter which operates based on a system, where a plurality of switching elements in one burner are alternately driven, is used.

Hereinafter, an operation of a heating cooking device is described with reference to the drawings. FIG. 11 is a block diagram showing a structure of a conventional heating cooking device 1100. Parts (a) through (f) of FIG. 12 show waveforms in respective sections of this conventional example. FIG. 13 is a load to heating power characteristic graph.

In FIG. 11, reference numeral 31 denotes a commercial power source, and reference numeral 32 denotes a rectifying circuit. Reference numeral 33 denotes an inverter circuit. The inverter circuit 33 includes first switching means 33a and second switching means 33b, a load coil 33c, and a resonant capacitor 33d. The inverter circuit 33 applies a high frequency current to the load coil 33c so as to inductively heat a load pan 34 which is magnetically coupled to the load coil 33c. A control circuit 35 includes: driving means 36 for driving the first switching means 33a and second switching means 33b; level setting means 37 for outputting a digital signal wherein an input current to the inverter circuit 33 becomes a predetermined value; D/A conversion means 38 for converting an output of the level setting means 37 to an analog value; reference oscillation means 39 for outputting a rectangular wave with a fixed High/Low ratio at a constant frequency; signal conversion means 41 for converting an output of the reference oscillation means 39 to a predetermined triangular wave; driving signal generation means 42 for receiving outputs of the D/A conversion means 38 and the signal conversion means 41 and outputting a signal which allows the driving means 36 to output driving signals to the first switching means 33a and second switching means 33b. Furthermore, in this conventional example, a microcomputer 40 includes the level setting means 37 and the reference oscillation means 39. Reference numeral 43 denotes input current detection means. The input current detection means 43 detects an input current to the inverter circuit 33 and outputs the detected value to the microcomputer 40. The microcomputer 40 changes an output value of the level setting means 37 based on this value, thereby controlling an input current to the inverter circuit 33 so as to be a desired value.

An operation of the above structure is described with reference to parts (a) through (f) of FIG. 12 and FIG. 13. The parts (a) through (f) of FIG. 12 show a timing chart illustrating: an output of the reference oscillation means 39; an output of the D/A conversion means 38; an output of the signal conversion means 41; an output of first comparison means 42a; an output of second comparison means 42b; and outputs of first non-conduction time addition means 42c and second non-conduction time addition means 42d. FIG. 13 shows a relationship between a driving time ratio T31/T32, which represents a ratio between a driving time T31 of the first switching means 33a and a driving time T32 of the second switching means 33b, and an input P to the load pan 34.

An operation of the above structure is described. The inverter circuit 33 converts a direct current, which is obtained by rectifying a current from the commercial power source 31 by the rectifying circuit 32, into a high frequency alternating current. The high frequency current is allowed to flow through a resonant loop formed by the load coil 33c and the resonant capacitor 33d, whereby an eddy current is generated in the load pan 34 which is magnetically coupled to the load coil 33c. Joule heat generated due to the eddy current inductively heats the load pan 34.

The microcomputer 40 outputs to the signal conversion means 41 by the reference oscillation means 39 a rectangular wave with a constant High/Low ratio ("1" in this example) at a constant frequency at a constant frequency T0 and having a constant amplitude as shown in part (a) of FIG. 12. The signal conversion means 41 converts this rectangular wave to a triangular wave as shown in part (b) of FIG. 12.

On the other hand, the microcomputer 40 increases or decreases a digital value output of the level setting means 37 such that an output of the input current detection means 43 becomes a desired value, whereby an analog output level Vo of the D/A conversion means 38 can be set to any voltage between Vl and Vh as shown in part (b) of FIG. 12.

In this conventional example, a case where the output voltage Vo of the D/A conversion means 38 is Vm shown in part (b) of FIG. 12, at which the driving time ratio T31/T32 is X, is considered. The first comparison means 42a compares the output voltage Vo(=Vm) of the D/A conversion means 38 with an output of the signal conversion means 41. The first comparison means 42a outputs High if the output of the signal conversion means 41 is greater than output voltage Vm of the D/A conversion means 38, and Low if the output of the signal conversion means 41 is smaller than output voltage Vo(=Vm) of the D/A conversion means 38, as shown in part (c) of FIG. 12. On the other hand, the second comparison means 42b compares the output voltage Vo(=Vm) of the D/A conversion means 38 with an output of the signal conversion means 41. The second comparison means 42b outputs Low if the output of the signal conversion means 41 is greater than output voltage Vm of the D/A conversion means 38, and High if the output of the signal conversion means 41 is smaller than output voltage Vo(=Vm) of the D/A conversion means 38, as shown in part (d) of FIG. 12. That is, since the second comparison means 42b produces an output logically inverted with respect to the output of the first comparison means 42a, the output of the second comparison means 42b is Low when the output of the first comparison means 42a is High, and the output of the second comparison means 42b is High when the output of the first comparison means 42a is Low.

The first non-conduction time addition means 42c receives the output of the first comparison means 42a, and produces an output having a rising edge delayed from a rising edge of the output of the first comparison means 42a by a first predetermined period Tda, and a falling edge which is in synchronization with a falling edge of the first comparison means 42a, as shown in part (e) of FIG. 12. On the other hand, the second non-conduction time addition means 42d receives the output of the second comparison means 42b, and produces an output having a rising edge delayed from a rising edge of the output of the second comparison means 42b by a second predetermined period Tdb, and a falling edge which is in synchronization with a falling edge of the second comparison means 42b, as shown in part (f) of FIG. 12. These output signals from the first non-conduction time addition means 42c and the second non-conduction time addition means 42d are output to the driving means 36, whereby the first switching means 33a and the second switching means 33b can be driven alternatively at a constant frequency.

Furthermore, setting of the power of heat supplied to the load pan 34 is performed by appropriately setting the output voltage Vo of the D/A conversion means 38 between Vh and Vl. When the output voltage Vo of the D/A conversion means 38 is equal to Vh, the driving time ratio T31/T32 is smaller than X, and the operation is performed at point A of FIG. 13. When the output voltage Vo of the D/A conversion means 38 is equal to Vm, the driving time ratio T31/T32 is equal to X, and the operation is performed at point B of FIG. 13. When the output voltage Vo of the D/A conversion means 38 is equal to Vl, the driving time ratio T31/T32 is greater than X, and the operation is performed at point C of FIG. 13.

As described above, according to a conventional inverter structure and control method, control of input P to the load pan 34 can be performed with a constant oscillation frequency.

However, the heating cooking device 1000 described above with reference to FIG. 10 has the following problems. In the structure shown in FIG. 10, in the case where an induction-heating operation is performed while indicating a portion to be heated, a magnetic flux generated by the heating coil 102 causes induced electromotive force in the wirings 1001 to the light emitting elements 105. As a result, a variation is caused in the brightness of an LED which is used as the light emitting elements 105, erroneous lighting of the LED used as the light emitting elements 105 is caused, or the light emitting elements 105 are broken due to the induced electromotive force which is greater than the voltage that can be withstood by the light emitting elements 105.

Further, power supply to the display means 106 is achieved through a single power source line (wirings 1001). Thus, in the case where the display means 106 needs to display control information from the output control means 104 while indicating a portion to be heated by the heating coil 102, the output of the display means results in an output from which it is difficult to recognize a portion to be heated by the heating coil 102 due to a variation in the brightness, a variation in a flashing frequency, etc. Furthermore, in the case where some trouble occurs in the power supply from the above power source line, display cannot be performed.

In the conventional heating cooking device 1100 shown in FIG. 11, a variation range of the analog output of the D/A conversion means 38 with respect to one digit of the digital output of the level setting means 37 is decreased, whereby a variation range of the driving time ratio T31/T32 is decreased, and a variation range of the heating power to heat the load pan 34 is decreased. In order to obtain a desirable heating power control range, the digital output of the level setting means 37 is from 4 bits to 8 bits. Since the D/A conversion means 38 has resistances arranged in a ladder pattern, it is necessary to provide a number of resistances which is relative to the output bit number of the level setting means 37. Furthermore, since the signal conversion means 41, which converts an output of the reference oscillation means 39 to a predetermined triangular wave, has a circuit structure where a resistance and a capacitor are combined, the number of components of the circuit is increased, and a variation is caused in each of the inputs to the first comparison means 42a and the second comparison means 42b due to a variation in the constant of a resistance or a capacitor. Thus, a timing of the outputs from the first comparison means 42a and the second comparison means 42b is varied. As a result, a driving timing of the first switching means 33a and the second switching means 33b and the driving time ratio T31/T32 are varied. Consequently, the conventional heating cooking device 1100 has problems, such as a large variation in the heating power to heat the load pan 34, a decrease in the controllability, or the like.

Objectives of the present invention are to solve the above problems, and to provide a highly reliable induction-heating cooking device wherein a variation in the brightness of display means, erroneous lighting of the display means, breakage of a light emitting element, which may be caused due to noise of a magnetic flux for induction heating, are prevented even during a heating operation.

Another objective of the present invention is to provide a highly reliable induction-heating cooking device wherein a portion to be heated by a heating coil can be readily recognized by supplying electric power through a plurality of power source lines according to a content output by the display means, and even when a trouble occurs in one power supply line, the display means can perform display using electric power obtained through another power supply line.

Still another objective of the present invention is to provide an easily-handlable, highly-reliable, and less-expensive induction-heating cooking device wherein the number of electronic components is reduced, and variations in the driving timing of the first switching means 33a and the second switching means 33b and the driving time ratio T31/T32 are suppressed, in order to obtain a desirable heating power to heat a load pan with a high accuracy.

DISCLOSURE OF THE INVENTION

An induction-heating cooking device of the present invention includes: an insulating plate which is partially or entirely light-transmissive, and on which an object to be heated is placed; a heating coil provided under the insulating plate, for heating the object to be heated; display means for indicating a portion to be heated by the heating coil through the insulating plate; and output control means for controlling electrical conduction to the heating coil, wherein the display means includes light emitting means which is provided in the vicinity of a magnetic flux generated by the heating coil, and the light emitting means is laid and connected radially along a radial direction of the heating coil for indicating a portion to be heated by the heating coil. With such a structure, the above objectives can be achieved.

The light emitting means may be connected by a plurality of wiring lines; at least one of the wiring lines may indicate a portion to be heated by the heating coil as an output of the display means; and at least one of the wiring lines may display control information from the output control means.

Another induction-heating cooking device of the present invention includes: an insulating plate which is partially or entirely light-transmissive, and on which an object to be heated is placed; a heating coil provided under the insulating plate, for heating the object to be heated; display means for indicating a portion to be heated by the heating coil through the insulating plate; and output control means for controlling electrical conduction to the heating coil, wherein the display means includes light emitting means, and the light emitting means is laid and connected so as to be powered from a plurality of power supply lines, an output of the display means indicates a portion to be heated by the heating coil, and displays control information from the output control means. With such a structure, the above objectives can be achieved.

At least one of the plurality of power supply lines may be formed by a power supply to which electric power is supplied by a trans-coupling to the heating coil.

Still another induction-heating cooking device of the present invention includes: an inverter circuit having first and second switching means; and a control circuit for controlling the inverter circuit, wherein the control circuit includes driving time ratio setting means, and driving means for driving the plurality of switching means, the driving time ratio setting means includes time ratio output means for outputting a drive timing signal which determines a drive time ratio of the first and second switching means based on an input current to the inverter circuit, and signal distribution means for outputting, based on the drive timing signal, first and second drive signals which are used for driving the first and second switching means, the driving time ratio is represented by a ratio of a first set time period T1, during which the first switching means is driven, and a second set time period T2, during which the second switching means is driven, where a sum T of the first set time period T1 and the second set time period T2 is constant, and the driving means alternately drives the first and second switching means based on the first and second driving signals. With such a structure, the above objectives can be achieved.

The first driving signal may begin after a first latency period elapses since a start timing of the first set time period, and end in synchronization with an end of the first set time period; and the second driving signal may begin after a second latency period elapses since an end timing of the first set time period, and end in synchronization with an end of the second set time period.

The time ratio output means may be formed by a microcomputer which has storage means and which operates based on a program stored in the storage means; and the signal distribution means may be formed by a part including a comparator and a capacitor, which do not operate based on a program.

The inverter circuit may further include: first and second resonant capacitors connected to the first and second switching means; and a load coil connected to the first and second switching means.

An induction-heating cooking device of the present invention includes: an inverter circuit having first and second switching means; and a control circuit for controlling the inverter circuit, wherein the control circuit includes driving time ratio setting means, and driving means for driving the plurality of switching means, the driving time ratio setting means includes first time ratio output means for outputting a first time ratio signal which has a constant period T and a first set time period T21, the first set time period T21 being determined based on an input current to the inverter circuit, and second time ratio output means for outputting a second time ratio signal which has the constant period T and a second set time period T22, and the second time ratio output means starts the second set time period T22 after a second latency period Td22 elapses since an end timing of the first set time period T21, and ends the second set time period T22 at a time which is a first latency period Td21 before a next start timing of the first set time period T21, the second time ratio output means determines the second set time period T22 based on the constant period T, the first latency period Td21, the first set time period T21, and the second latency period Td22, and the driving means alternately drives the first and second switching means based on the first and second time ratio signals. With such a structure, the above objectives can be achieved.

The control circuit may further include zero point detection means for detecting a zero point of a commercial power supply; the driving time ratio setting means may be formed by a microcomputer including storage means and calculation means; and the driving time ratio setting means may set the first set time period T21 and the second set time period T22 at a timing corresponding to an output of the zero point detection means.

The storage means may store the first and second latency periods Td21 and Td22; the control circuit further may include latency time change means; and the microcomputer may change at least one of the first latency period Td21 and the second latency period Td22, which are stored in the storage means, according to an output of the latency time change means.

The control circuit may further include operation setting means for setting an operation state of the control circuit; and the microcomputer may change at least one of the first latency period Td21 or the second latency period Td22, which are stored in the storage means, according to an output of the latency time change means, at at least one of a timing when the operation state of the control circuit is changed by the operation setting means, and a timing when the control circuit begins its operation.

According to one aspect of the present invention, there is provided a highly reliable induction-heating cooking device wherein: a crossing angle of a magnetic flux generated by a heating coil and a wiring to light emitting means is small, whereby induced electromotive force generated in the wiring can be suppressed; and a variation in the brightness of display means, erroneous lighting of the display means, and breakage of an element, can be prevented.

According to another aspect of the present invention, there is provided a highly reliable induction-heating cooking device wherein: noise superposed on a wiring is dispersed by dividing the wiring into multiple wiring lines; even when a trouble occurs in one wiring line, a portion to be heated by a heating coil can be indicated by using another wiring line; the portion to be heated by the heating coil can be indicated while preventing a variation in the brightness of display means, erroneous lighting of the display means, and breakage of an element.

According to still another aspect of the present invention, there is provided a highly reliable induction-heating cooking device wherein: in the case where a large electric power is consumed by an output of the display means, electric power can also be supplied via another power supply line; and even when a trouble occurs in one power supply line, a portion to be heated by the heating coil can be indicated using another power supply line.

According to still another aspect of the present invention, there is provided a highly reliable induction-heating cooking device wherein: large electric power can be supplied to the light emitting means according to an output of the heating coil; and even when a trouble occurs in one power supply line, a portion to be heated by the heating coil can be indicated using another power supply line.

According to still another aspect of the present invention, time ratio output means has a function of outputting a signal where a time ratio can be changed at a constant frequency according to a control signal input to driving time ratio setting means. This function can be achieved by a timer function for counting a first time period which corresponds to an output time ratio, and a timer function for counting a second time period which is determined such that the sum of the first time period and the second time period is constant or which corresponds to a constant period. Thus, a signal where the time ratio can be changed at a constant frequency using a digital calculation device, such as a microcomputer, can be readily output. This output signal is distributed by signal distribution means to a plurality of switching means, so as to alternately drive the plurality of switching means. Thus, high speed processing that is difficult to perform at a program processing speed of a microcomputer, or the like, can be performed: for example, the operation can be kept on standby until an applied voltage, which is applied when the switching means are ON or OFF, reaches a predetermined value. Thus, in the driving time ratio setting means, the range of processing which can be achieved by an integrated circuit, such as a microcomputer, is extended, and a portion formed by other components is minimized, so that the degree of integration is increased. With such an arrangement, the driving time ratio setting means is simplified and the size thereof is decreased. The amount of a high-frequency current flowing through a load coil can be controlled by alternately driving a plurality of switching means.

According to still another aspect of the present invention, time ratio output means outputs a single output signal to a signal distribution means. The time ratio of this output signal is changed simply by inputting information about an input current or an output voltage of an inverter circuit (it is only necessary to substantially change a first set time). Thus, the driving time ratio setting means can be integrally formed by another control circuit block and a digital calculation element, such as a microcomputer or the like. Further, a first latency period and a second standby period can be determined based on a single driving time ratio signal having a constant frequency, and a plurality of switching means can be alternately driven. Thus, the operation is on standby until a resonant voltage or current, which is applied when the switching means are ON or OFF, reaches a value suitable to switching, so that a switching mode is optimized. With such an arrangement, an increase of the loss in the switching means is suppressed, and the operation is prevented from going out of a safety operation range, so as not to break the switching means. Furthermore, a signal distribution section which requires high-speed processing is separated, whereby the size of a circuit structure of the driving time ratio setting means can be decreased.

Figure 6:
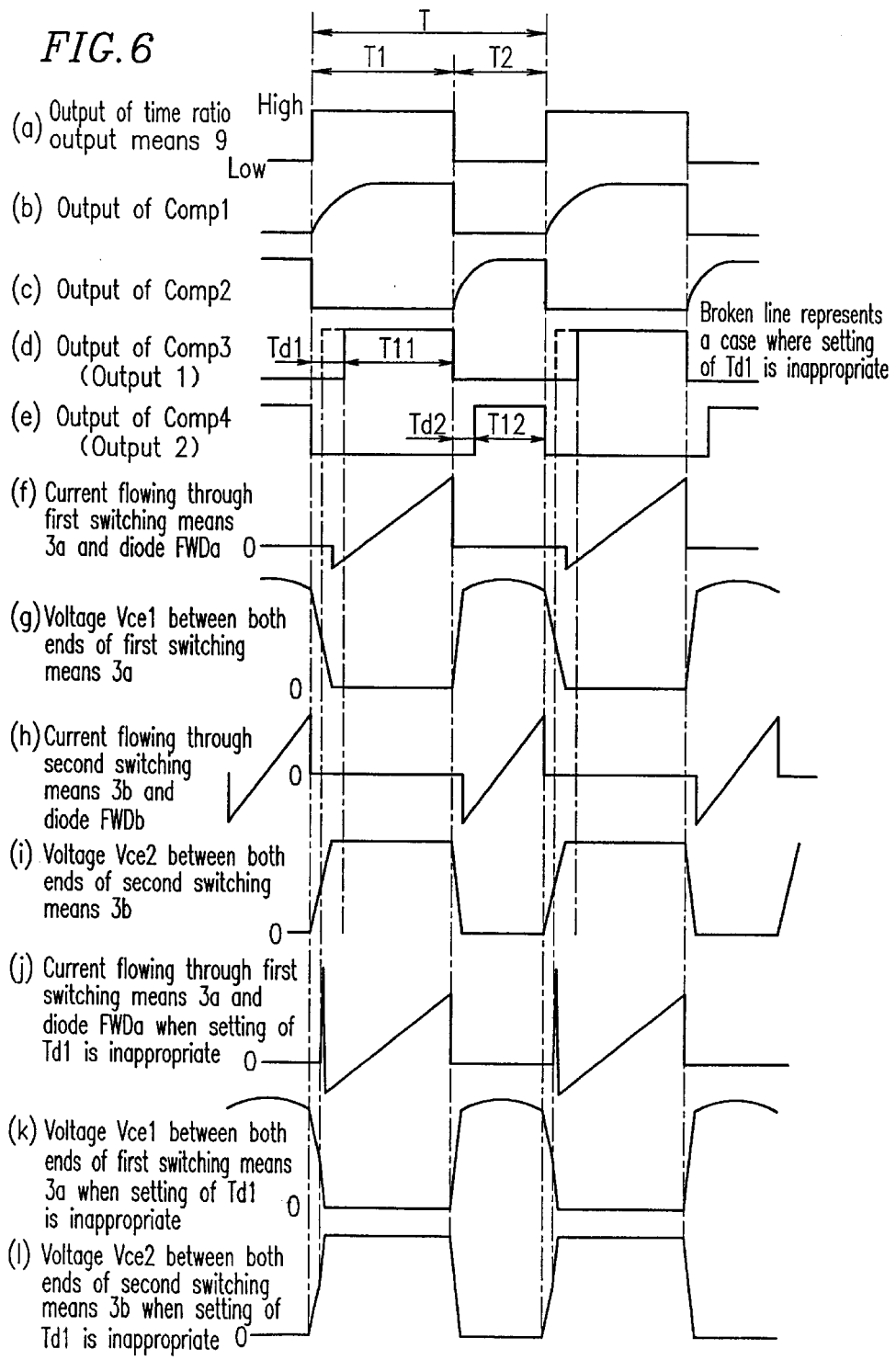

Parts (a) through (l) of FIG. 6 show waveforms output from respective sections of the heating cooking device according to embodiment 5 of the present invention.

Figure 7:
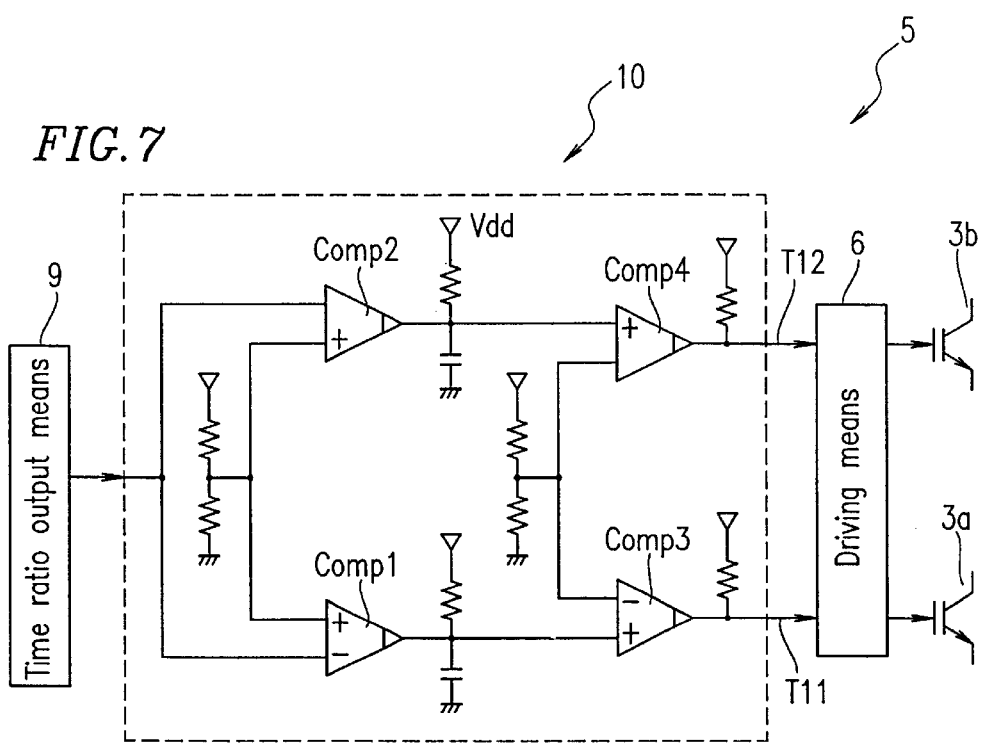

FIG. 7 is a circuit structure diagram of signal distribution means according to embodiment 5 of the present invention.

Figure 8:
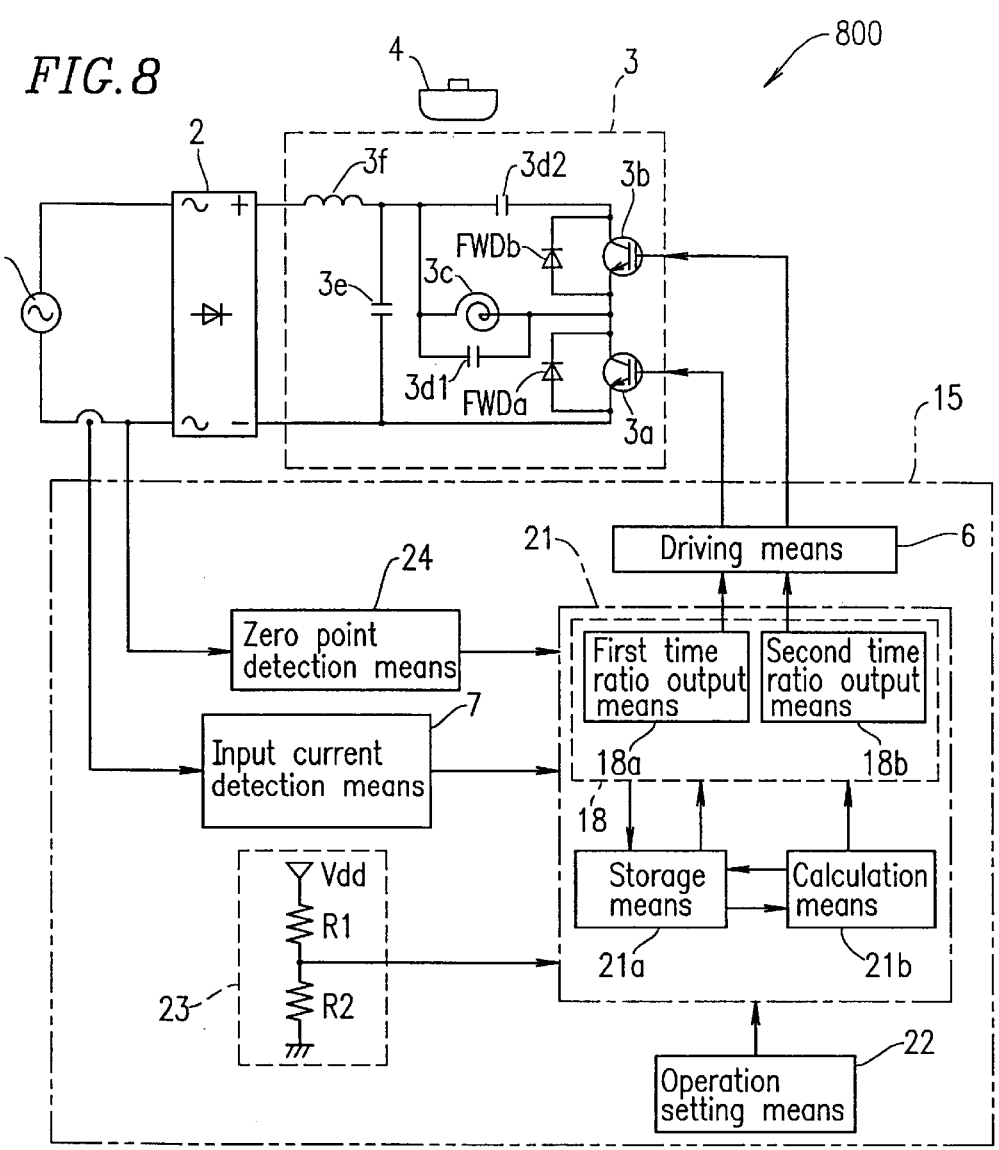

FIG. 8 is a block diagram showing a structure of a heating cooking device according to embodiment 2 of the present invention.

Figure 9:
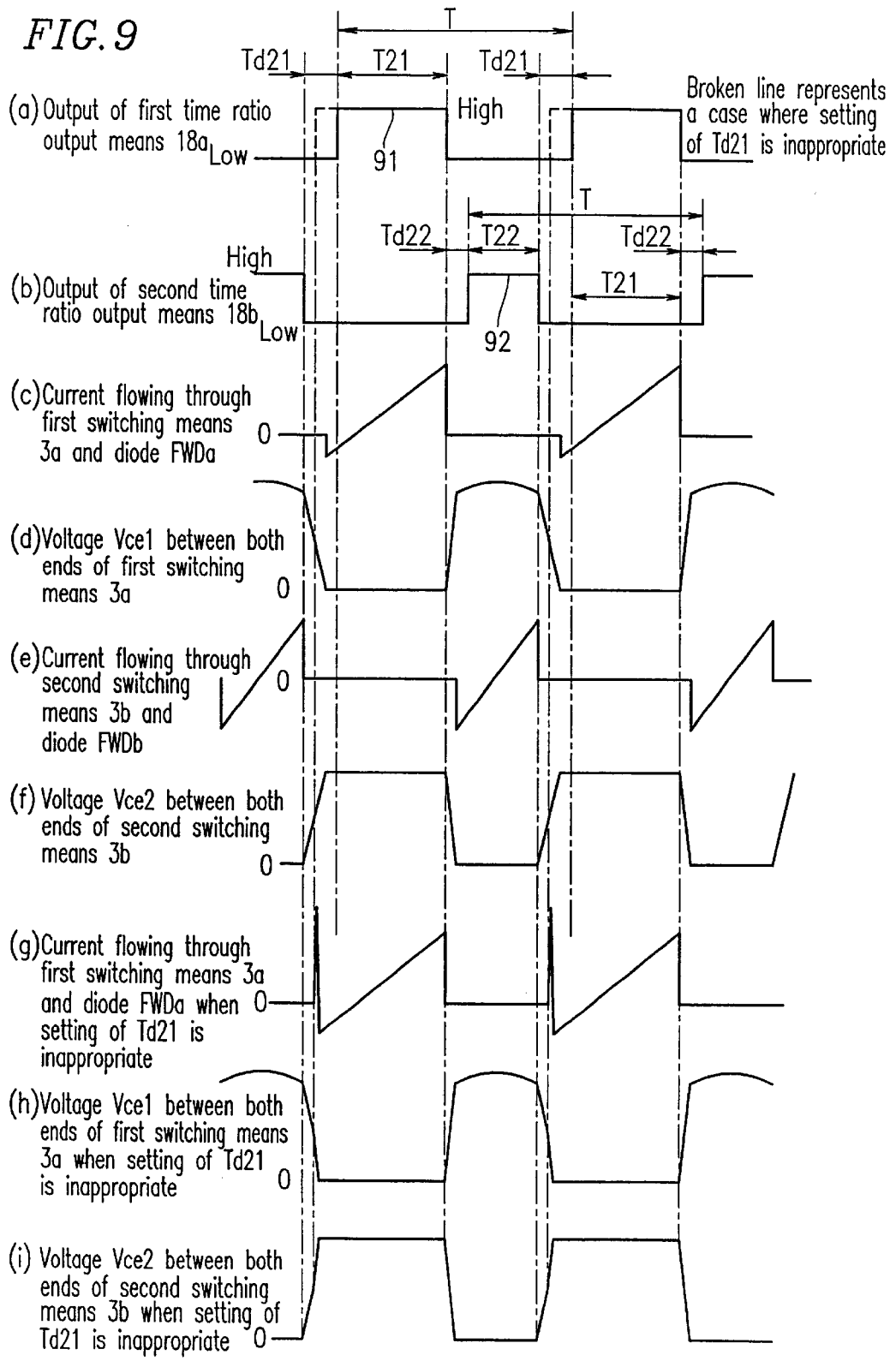

Parts (a) through (i) of FIG. 9 show waveforms output from respective sections of the heating cooking device according to embodiment 2 of the present invention.

Figure 10:
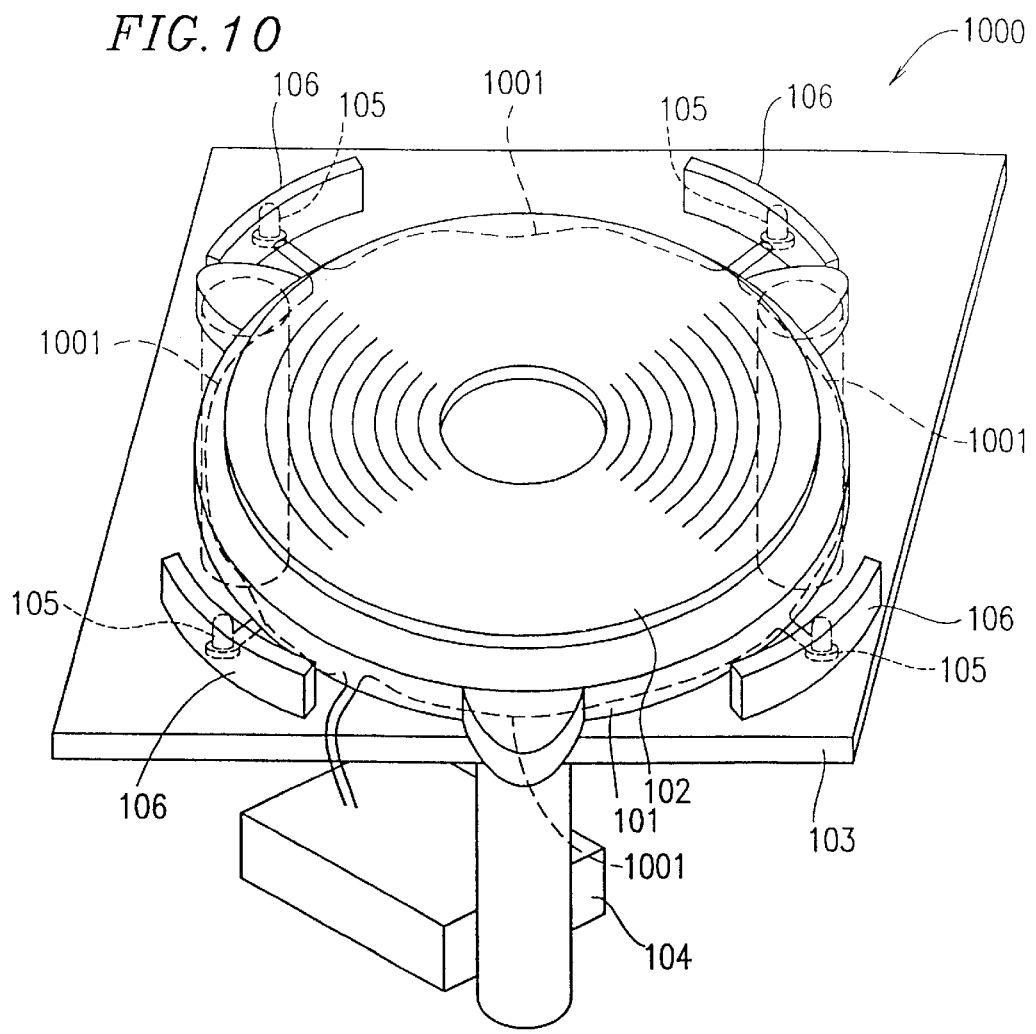

FIG. 10 is a perspective view showing a heating coil and a peripheral portion thereof in a conventional induction-heating cooking device.

Figure 11:
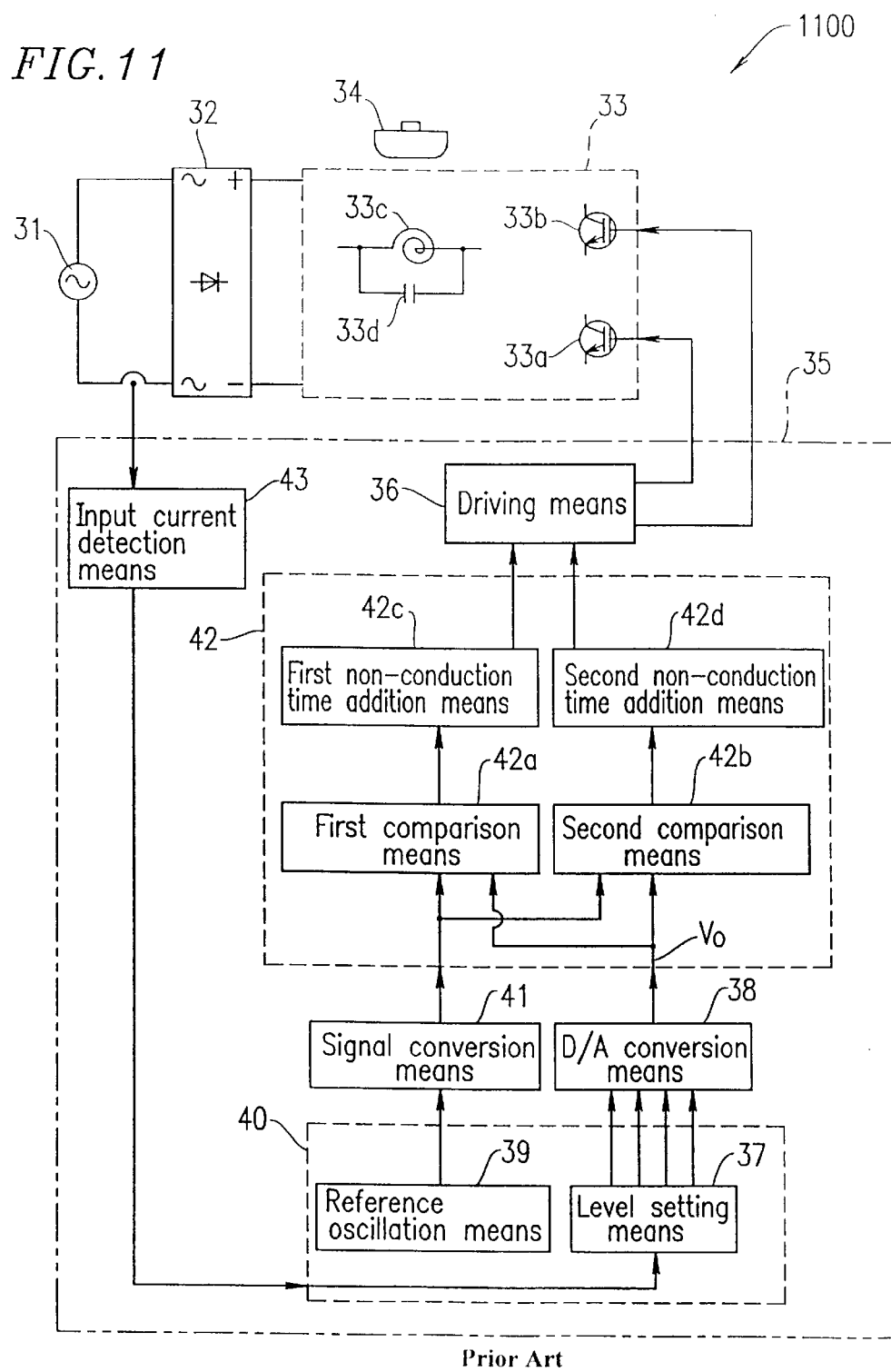

FIG. 11 is a block diagram showing a structure of a conventional heating cooking device.

Figure 12:
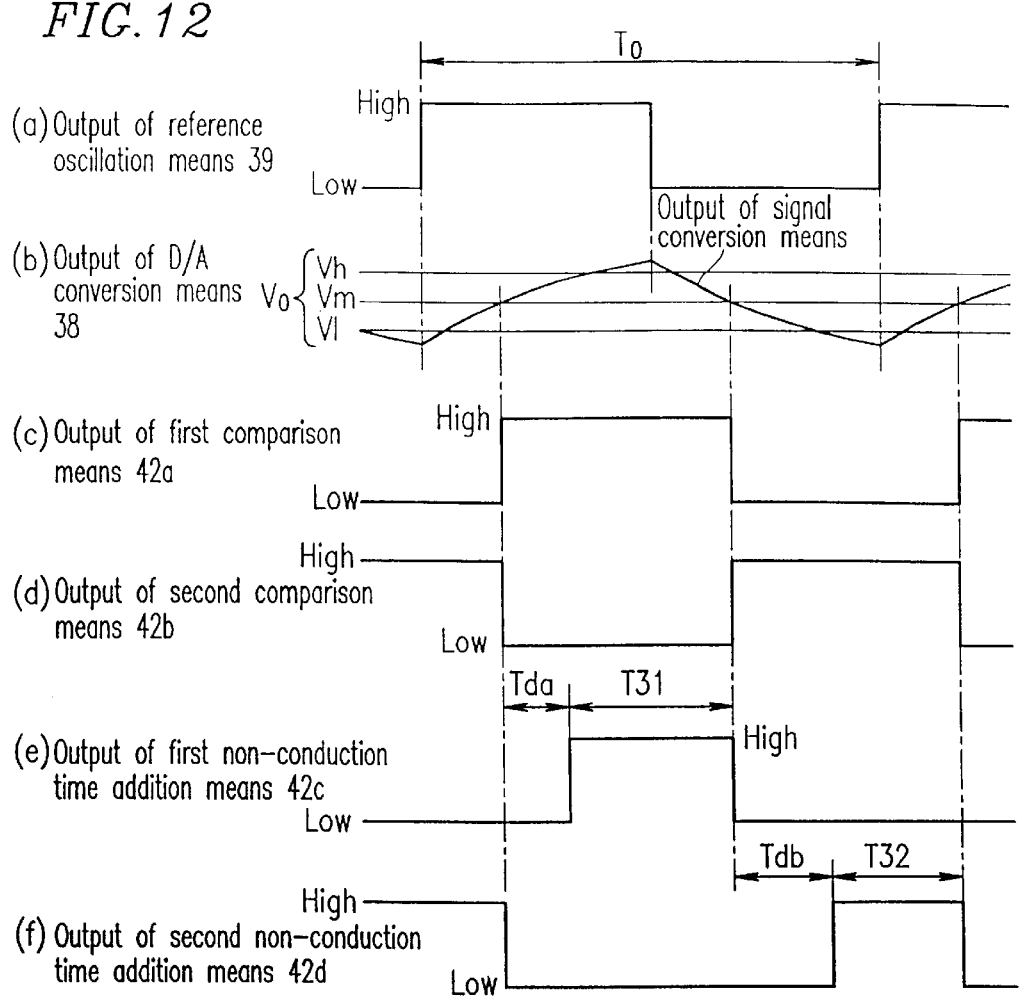

Parts (a) through (f) of FIG. 12 show waveforms output from respective sections of a conventional heating cooking device.

Figure 13:
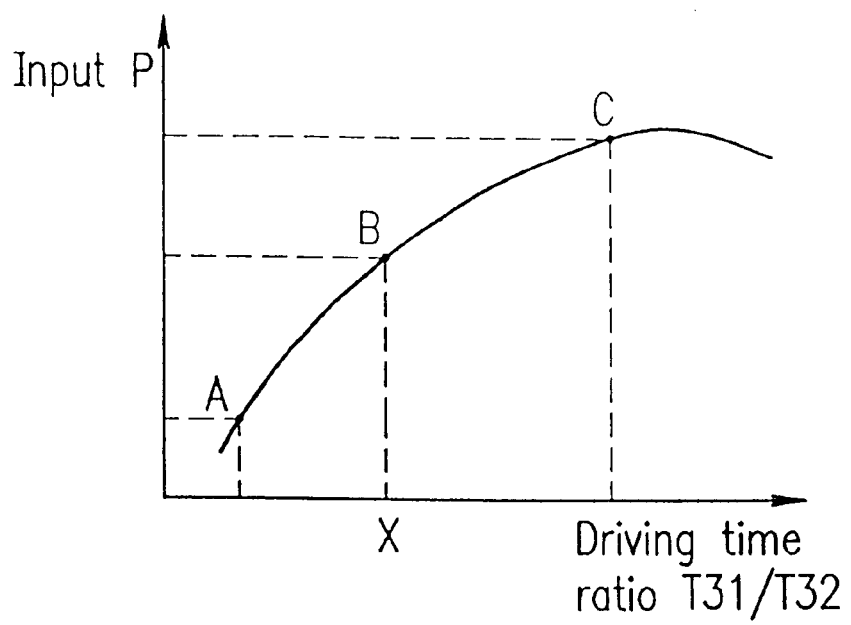

FIG. 13 is a load to heating power characteristic graph with respect to a driving time ratio in a conventional heating cooking device.

BEST MODE FOR CARRYING OUT THE INVENTION (Embodiment 1)

Figure 1:
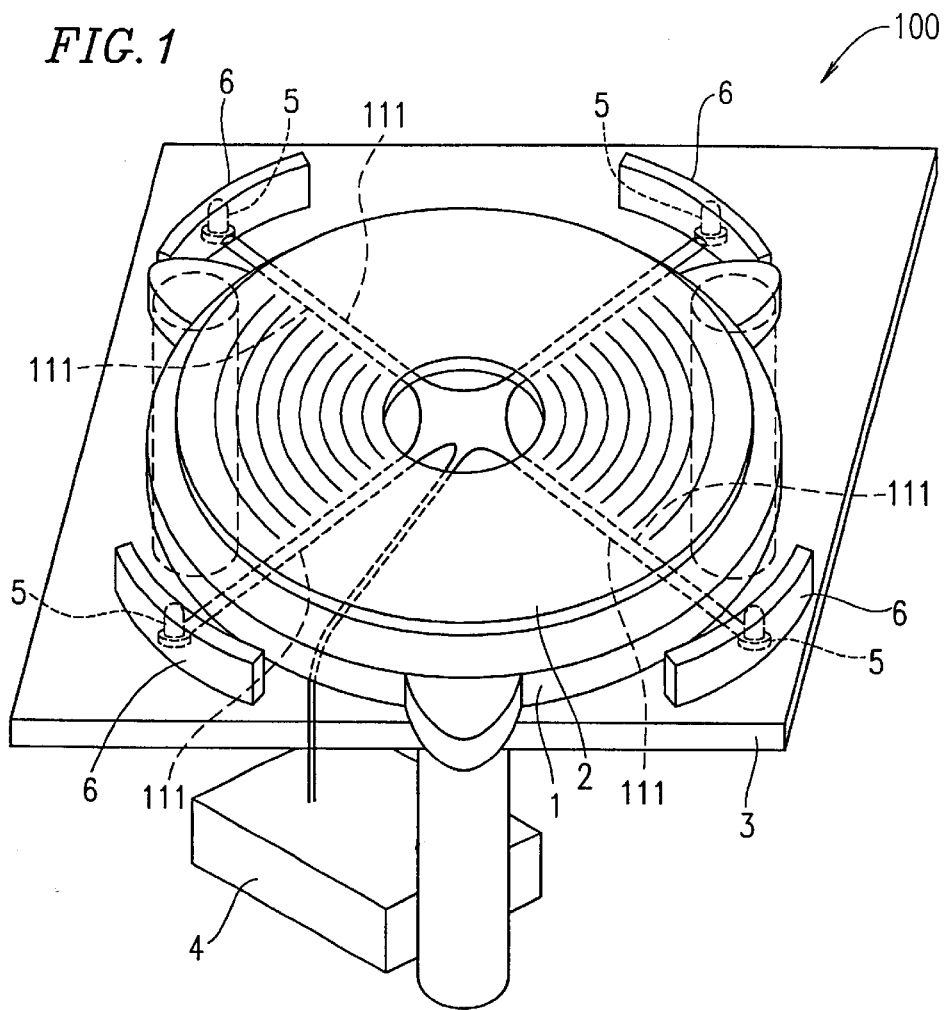
FIG. 1 is a perspective view showing a heating coil and a peripheral portion thereof in an induction-heating cooking device according to embodiment 1 of the present invention.

Hereinafter, a heating cooking device 100 according to embodiment 1 of the present invention is described with reference to the drawings. As shown in FIG. 1, the heating cooking device 100 includes: a heating coil table 1; a heating coil 2 provided on the heating coil table 1; a light-transmissive insulating plate 3 provided above the heating coil 2; and output control means 4 which controls electrical conduction to the heating coil 2. The heating cooking device 100 further includes a plurality of display means 6 provided with light emitting elements 5 in the vicinity of a magnetic flux generated by the heating coil 2 below the insulating plate 3. The light emitting elements 5 indicate the position of the heating coil 2 through the insulating plate such that a user can recognizes the position.

A plurality of LEDs, which are provided as the light emitting elements 5, are provided in the vicinity of a portion where induction heating can be performed by a magnetic flux generated by the heating coil 2, and are connected by wirings 111 so as to form an electric serial circuit. A loop formed by the wirings provided between the plurality of LEDs (light emitting elements 5) is laid along a radial direction such that the area of the wirings which cross with a magnetic flux generated for induction heating by the heating coil 2 is reduced.

An operation of the induction-heating cooking device 100 having the above structure is described. When electrical conduction to the heating coil 2 is controllable by the output control means 4, the output control means 4 starts electrical conduction to the heating coil 2, and the display means 6 illuminates a portion to be heated by the heating coil 2, whereby a user can readily recognize a position where an object to be heated, such as a pan, is to be placed.

As described above, according to this embodiment, the wirings connected to the light emitting elements 5 are laid along a radial direction of the heating coil 2 such that the opening area of the wirings which cross with a magnetic flux generated for induction heating by the heating coil 2 is reduced. With such a structure, induced electromotive force generated in the wirings is suppressed. As a result, a highly reliable induction-heating cooking device capable of preventing a variation in the brightness of the display means 6, erroneous lighting of the display means 6, and breakage of an element, can be obtained.

(Embodiment 2)

Figure 2:
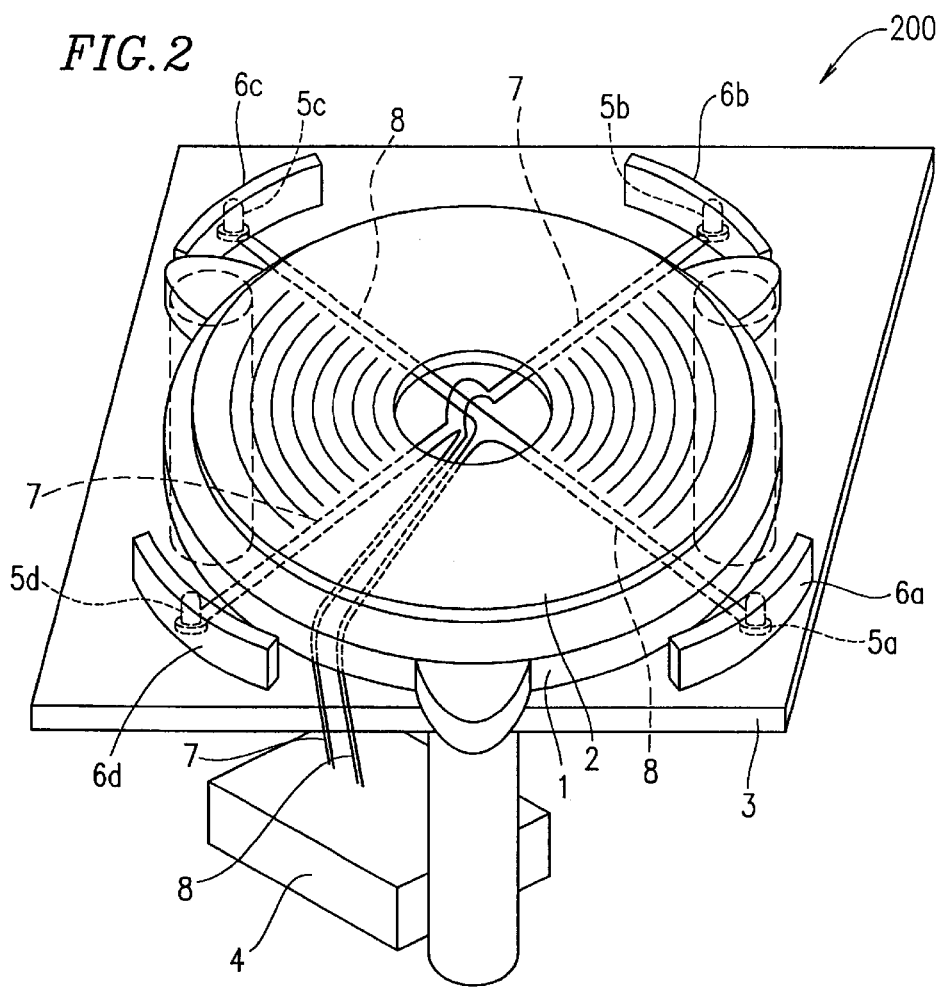
FIG. 2 is a perspective view showing a heating coil and a peripheral portion thereof in an induction-heating cooking device according to embodiment 2 of the present invention.

Next, a heating cooking device 200 according to embodiment 2 of the present invention is described with reference to FIG. 2. In FIG. 2, a heating section including the heating coil table 1, the heating coil 2, the insulating plate 3, and the output control means 4, has the same structure as that of embodiment 1. As shown in FIG. 2, display means 6a, 6b, 6c, and 6d respectively include light emitting elements 5a, 5b, 5c, and 5d provided in the vicinity of a magnetic flux generated by the heating coil 2. As shown in FIG. 2, the light emitting elements 5a and 5c are connected by a first wiring line 8. The light emitting elements 5a and 5c are electrically powered through the first wiring line 8. The light emitting elements 5b and 5d are connected by a second wiring line 7. The light emitting elements 5b and 5d are electrically powered through the second wiring line 7. As described in embodiment 1 in connection with the wirings 111, a loop formed by the first and second wiring lines 8 and 7 is, for example, laid along a radial direction of the heating coil 2 such that the opening area of the wiring lines which cross with a magnetic flux generated by the heating coil 2 is sufficiently small.

An operation of the induction-heating cooking device 200 having the above structure is described. When electrical conduction to the heating coil 2 is controllable by the output control means 4, the output control means 4 starts electrical conduction to the light emitting elements 5a and 5c through the first wiring line 8 and electrical conduction to the light emitting elements 5b and 5d through the second wiring line 7. The display means 6a, 6b, 6c, and 6d illuminate a portion to be heated by the heating coil 2, whereby a user can readily recognize a position where an object to be heated, such as a pan, is to be placed.

After the electrical conduction to the heating coil 2 is started, the display means 6b and 6d display control information, such as information which informs that an object to be heated has a load which is not suitable for induction heating, information about the heating power during heating of the object, information which informs that a heated object or the insulating plate 3 is at a high temperature, or information which informs that the heating cooking device 200 is in an abnormal operation state, using electrical conduction of the second wiring line 7. The display means 6a and 6c indicate a portion to be heated by the heating coil 2 using electrical conduction of the first wiring line 8.

As described above in connection with embodiment 1, according to this embodiment also, undesirable induced electromotive force which is generated in the first wiring line 8 and the second wiring line 7 is suppressed. As a result, a highly reliable induction-heating cooking device capable of preventing a variation in the brightness of the display means 6a, 6b, 6c, and 6d, erroneous lighting of the display means 6a, 6b, 6c, and 6d, and breakage of an element, can be obtained. Further, the wiring line is divided into the first wiring line 8 and the second wiring line 7, and accordingly, the amount of noise superposed on the wiring line is divided. Therefore, an induction-heating cooking device having reliability higher than that of embodiment 1 can be realized.

Furthermore, electrical conduction is performed through two wiring lines, i.e., a wiring line to the light emitting elements 5a and 5c and a wiring line to the light emitting elements 5b and 5d. Thus, control information, such as information about heating power, information about a high temperature, etc., can be displayed while a user can readily recognize a position at which an object to be heated, such as a pan, is to be placed.

Further still, the display means corresponding to a light emitting element connected to each wiring line is arranged concentrically with the heating coil such that a portion to be heated by the heating coil can be recognized. Even when a trouble occurs in one of the plurality of wiring lines, a portion to be heated by the heating coil 2 can be recognized due to display of the display means corresponding to a light emitting element connected to another one of the plurality of wiring lines.

(Embodiment 3)

Figure 3:
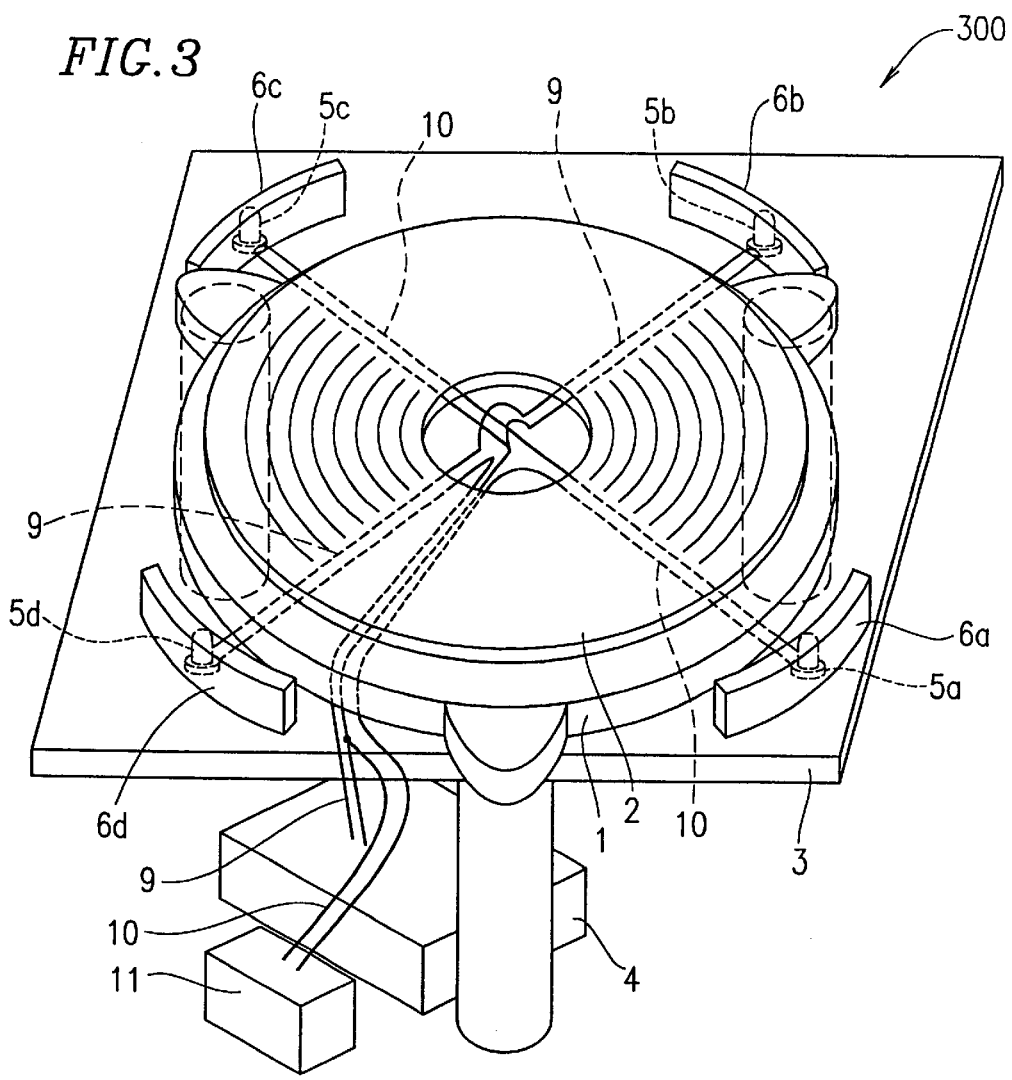
FIG. 3 is a perspective view showing a heating coil and a peripheral portion thereof in an induction-heating cooking device according to embodiment 3 of the present invention.

Next, a heating cooking device 300 according to embodiment 3 of the present invention is described with reference to FIG. 3. In FIG. 3, a heating section including the heating coil table 1, the heating coil 2, the insulating plate 3, and the output control means 4, has the same structure as that of embodiment 1. As shown in FIG. 3, display means 6a, 6b, 6c, and 6d respectively include light emitting elements 5a, 5b, 5c, and 5d provided in the vicinity of a magnetic flux generated by the heating coil 2. The light emitting elements 5a and 5c are electrically powered through a second power supply line 10. The light emitting elements 5b and 5d are electrically powered through a first power supply line 9. The second power supply line 10 is connected to another power supply circuit 11.

An operation of the induction-heating cooking device 300 having the above structure is described. When electrical conduction to the heating coil 2 is controllable by the output control means 4, the output control means 4 allows the light emitting elements 5b and 5d to emit light using power supplied through the first power supply line 9. The display means 6b and 6d illuminate a portion to be heated by the heating coil 2. With this display, a user can readily recognize a position where an object to be heated, such as a pan, is to be placed.

After the electrical conduction to the heating coil 2 is started, the display means 6a and 6c display control information, such as information about the heating power during heating of the object and information which warns that a heated object or the insulating plate 3 is at a high temperature, by allowing the light emitting elements 5a and 5c to emit light using electric power supplied through the second power supply line 10 from the another power supply circuit 11.

As described above, according to this embodiment, supply of electric power to the light emitting elements 5a, 5b, 5c, and 5d is performed through a plurality of power supply lines. Thus, a user can readily recognize a position where an object to be heated, such as a pan, is to be placed. Furthermore, in the case where a large electric power is consumed by an output of the display means for displaying information about the heating power, warning of high temperatures, etc., electric power can be supplied via another power supply line. Even when a trouble occurs in one power supply line, a portion to be heated by the heating coil 2 can be indicated using another power supply line.

(Embodiment 4)

Figure 4:
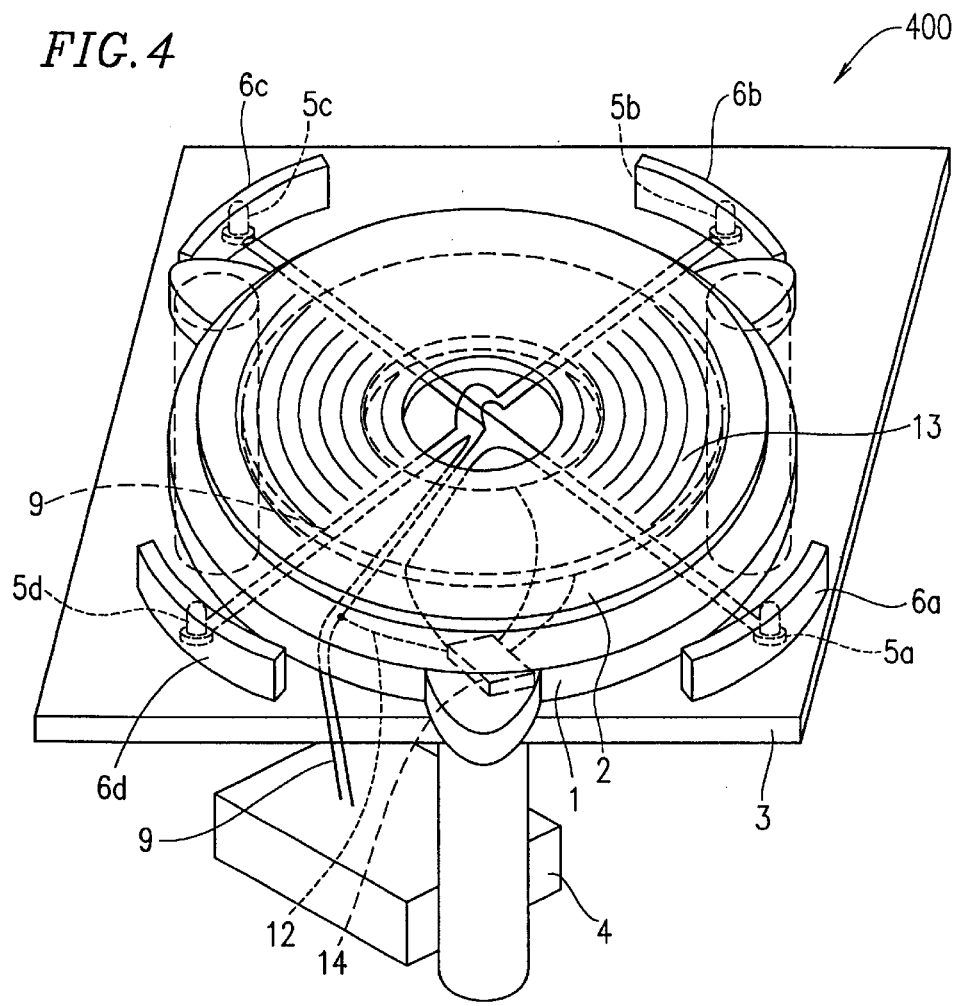
FIG. 4 is a perspective view showing a heating coil and a peripheral portion thereof in an induction-heating cooking device according to embodiment 4 of the present invention.

Next, a heating cooking device 400 according to embodiment 4 of the present invention is described with reference to FIG. 4. In FIG. 4, a heating section including the heating coil table 1, the heating coil 2, the insulating plate 3, and the output control means 4, has the same structure as that of embodiment 1. As shown in FIG. 4, display means 6a, 6b, 6c, and 6d respectively include light emitting elements 5a, 5b, 5c, and 5d provided in the vicinity of a magnetic flux generated by the heating coil 2. The light emitting elements 5a, 5b, 5c, and 5d are connected so as to be electrically powered by both a first power supply line 9 and a third power supply line 12. The third power supply line 12 is connected to a conversion circuit 14. The conversion circuit 14 is connected to the heating coil 2 and a secondary-side coil 13 which establishes a trans-coupling to the heating coil 2. The conversion circuit 14 converts an alternating electric power obtained from the secondary-side coil 13 to electric power supplied to the light emitting elements 5a, 5b, 5c, and 5d.

An operation of the induction-heating cooking device 400 having the above structure is described. When electrical conduction to the heating coil 2 is controllable by the output control means 4, the output control means 4 allows the light emitting elements 5b and 5d to emit light using power supplied through the first power supply line 9. The voltage of a commercial power supply, such as a power supply trans provided in the output control means 4, a switching power supply, etc., is decreased so as to produce a power supply for control. The produced power supply for control is supplied to each light emitting element through the first power supply line 9. The display means 6b and 6d illuminate a portion to be heated by the heating coil 2. With this display, a user can readily recognize a position where an object to be heated, such as a pan, is to be placed.

After the electrical conduction to the heating coil 2 is started, electric power is supplied to the light emitting elements 5a and 5c through the conversion circuit 14 and the third power supply line 12 from the secondary-side coil 13 which establishes a trans-coupling to the heating coil 2. The display means 6a and 6c display control information, such as information about the heating power during heating of the object, and information which warns of a high temperature.

As described above, according to this embodiment, supply of electric power to the light emitting elements 5a, 5b, 5c, and 5d is performed through a plurality of power supply lines. Thus, a user can readily recognize a position where an object to be heated, such as a pan, is to be placed. Furthermore, in the case where a large electric power is consumed by an output of the display means for displaying information about the heating power during an induction-heating operation, warning of high temperature, etc., electric power can be supplied from another power supply line which establishes a trans-coupling with the heating coil 2 to generate electric power. Furthermore, a highly reliable induction-heating cooking device wherein, even when a trouble occurs in one power supply line, display can be achieved using another power supply line, can be realized.

In a conventional structure, the display means 6a and 6a cannot perform display before occurrence of an induction-heating operation only with the power supply that is supplied from the secondary-side coil 13 to the light emitting elements 5a and 5c, and therefore a portion to be heated by the heating coil 2 cannot be illuminated. However, by employing a structure of the present invention, the display means 6b and 6d can illuminate a portion to be heated by the heating coil 2 using an output of the first power supply line 9. Furthermore, in the case where a large electric power is consumed by an output of the display means 6a and 6c, electric power can be supplied from the third power supply line 12 which establishes a trans-coupling with the heating coil 2 to generate electric power.

The descriptions in embodiment 4 are mainly focused on a feature that a loop formed by wirings to the light emitting elements 5a, 5b, 5c, and 5d is, for example, laid along a radial direction of the heating coil 2 such that an opening area of the wirings which crosses with a magnetic flux is sufficiently small so as not to generate undesirable induced electromotive force due to the magnetic flux generated by the heating coil 2. In the case where a plurality of wirings are connected to a signal light emitting element, the wirings are twisted into a strand and laid along the radial direction, whereby noise superposed on the wirings is further suppressed. As a result, reliability of an induction-heating cooking device is further increased.

Furthermore, although not described above in embodiment 4, in the heating coil table 1 provided below the heating coil 2, a magnetic element, such as a ferrite, is provided along the radial direction of the heating coil 2, and the magnetic flux generated by the heating coil 2 is concentrated in the magnetic element. Therefore, a wiring is provided at a position away from the magnetic element, whereby noise superposed on the wiring is suppressed.

Furthermore, in embodiment 4, LEDs (which are semiconductor light emitting elements) are used as a specific example of the light emitting elements 5a, 5b, 5c, and 5d, but the present invention is not limited thereto. Even when small filament lamps are employed, a variation in the brightness of display means, erroneous lighting of the display means, and breakage of a light emitting element can be prevented, i.e., the same effects can be obtained.

Furthermore, referring to the drawing which shows the structure of embodiment 4, one display means includes one light emitting element. Alternatively, a plurality of light emitting elements may be provided in one display means. In such a case, the brightness of display can be increased, and a variation of the brightness can be suppressed, while a portion to be heated by the heating coil 2 can be indicated, i.e., the effects of the present invention can be obtained.

Alternatively, light emitting elements connected to different wiring lines, light emitting elements connected to different power source lines, or light emitting elements emitting different colors of light may be provided in one display means. With such a structure, control information can be displayed while a portion to be heated by the heating coil 2 is indicated. Further, even when a trouble occurs in one light emitting element, a portion to be heated by the heating coil 2 can be indicated by another light emitting element. Thus, the effects of the present invention can be obtained.

(Embodiment 5)

Figure 5:
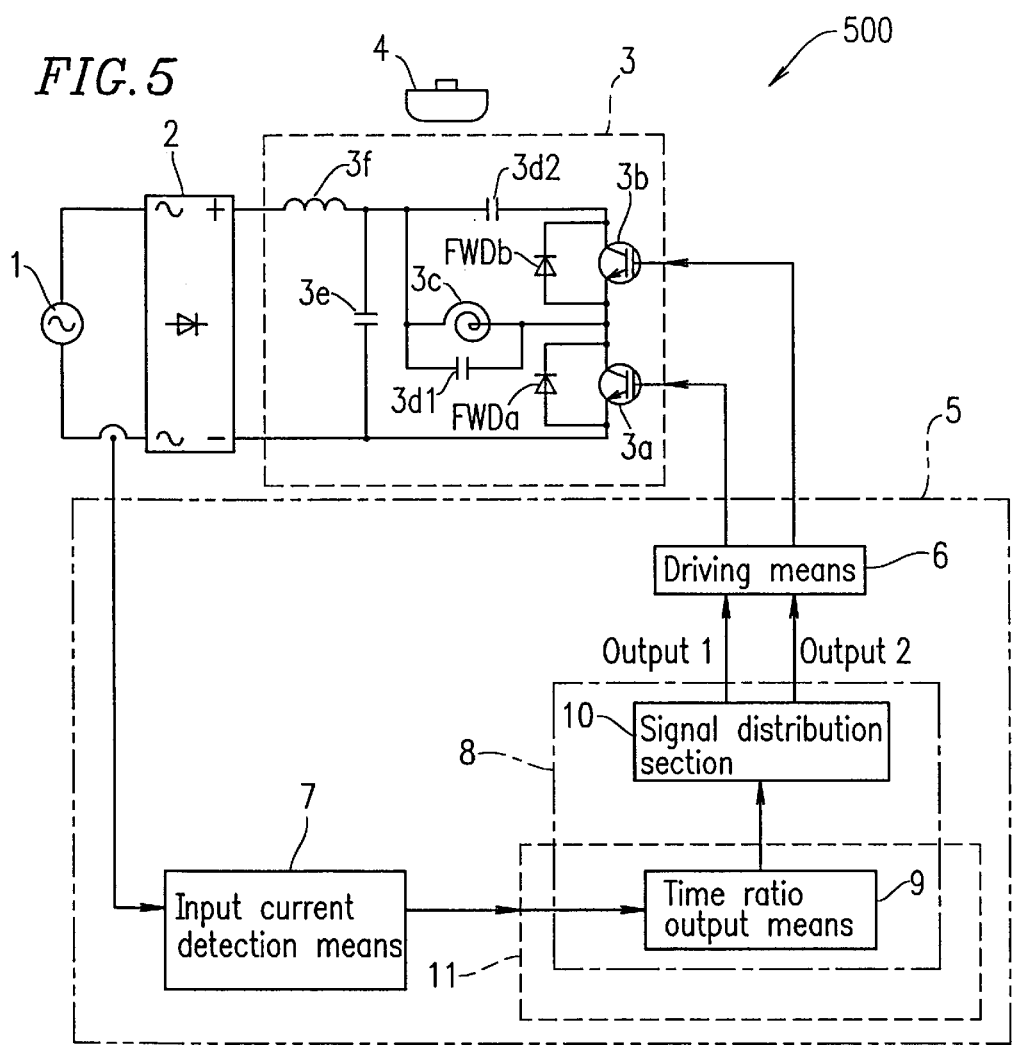
FIG. 5 is a block diagram showing a structure of a heating cooking device according to embodiment 5 of the present invention.

Embodiment 5 is described with reference to the drawings. FIG. 5 is a block diagram showing a structure of an induction-heating cooking device according to embodiment 5 of the present invention. FIG. 6 shows waveforms output from respective sections according to embodiment 5 of the present invention. FIG. 7 is a circuit structure diagram of signal distribution means according to embodiment 5 of the present invention.

In FIG. 5, reference numeral 1 denotes a commercial power supply; reference numeral 2 denotes a rectification circuit; and reference numeral 3 denotes an inverter circuit. The inverter circuit 3 includes: a choke coil 3f; a smoothing capacitor 3e; first switching means 3a and second switching means 3b which are not connected to identical potentials; diodes FWDa and FWDb; a load coil 3c; and resonant capacitors 3d1 and 3d2 (where the electric capacity of the resonant capacitor 3d1 is smaller than the electric capacity of the resonant capacitor 3d2). The inverter circuit 3 inductively heats a load pan 4 by applying a high frequency current to the load coil 3c.

The control circuit 5 includes: driving means 6 for driving the first switching means 3a and second switching means 3b; input current detection means 7 for detecting an input current to the inverter circuit 3; driving time ratio setting means 8 for outputting a timing signal which alternately drives the first switching means 3a and second switching means 3b at a constant frequency such that an output of the input current detection means 7 becomes a desired input current; and a microcomputer 11.

The driving time ratio setting means 8 appropriately changes the High/Low ratio at a constant frequency by a program. The driving time ratio setting means 8 includes: time ratio output means 9 incorporated in the microcomputer 11; and signal distribution means 10 for converting a single output of the time ratio output means 9 so as to be divided into signals which can alternately drive the first and second switching means 3a and 3b.

The microcomputer 11 is a one chip microcomputer including a CPU, a RAM, a ROM, and input/output terminals, which is molded by, for example, a resin or the like. The microcomputer 11 has a specific function of outputting to the signal distribution means 10 a drive timing signal which determines the driving time ratio between the first and second switching means 3a and 3b based on an incorporated program, such that an output of the input current detection means 7 becomes a desired value set by the program.

An operation of the above structure is described below. The rectification circuit 2 rectifies an alternating current from the commercial power supply 1. The inverter circuit 3 converts a direct current smoothed by the choke coil 3f and the smoothing capacitor 3e into a high frequency alternating current. The inverter circuit 3 allows the high frequency alternating current to flow through a resonant loop formed by the load coil 3a and the resonant capacitors 3d1 and 3d2, whereby an eddy current is generated in the load pan 4 which is magnetically coupled to the load coil 3c, and the load pan 4 is inductively heated with Joule heat generated due to the eddy current.

In this embodiment, the inverter circuit 3 has a structure shown in FIG. 5. The operations of the first and second switching means 3a and 3b are illustrated by the waveforms of parts (f) through (i) of FIG. 6.

The microcomputer 11 changes the High/Low ratio of the output of the time ratio output means 9 based on a program such that a value detected by the input current detection means 7 becomes a desired value. The microcomputer 11 has a timer function of counting a first period (High period) T1 corresponding to a time ratio, and a timer function of counting a second period (Low period) T2 which is determined such that the sum of the first period T1 and the second period T2 is constant or which corresponds to a constant period, as shown in part (a) of FIG. 6. The microcomputer 11 controls the High/Low ratio of the output of the time ratio output means 9 by increasing/decreasing the first period (High period) T1 and the second period (Low period) T2 such that the sum T of the periods T1 and T2 is constant.

Referring to FIG. 7, the signal distribution means 10 includes comparators Comp1, Comp2, Comp3, and Comp4 The signal distribution means 10 outputs a first driving signal T11 and a second driving signal T12. Referring to the output of the time ratio output means 9 shown in part (a) of FIG. 6 and parts (b) through (e) of FIG. 6, the first driving signal T11 starts after a first latency period Td1 elapses since the start timing of the first period (High period) T1 of the output of the time ratio output means 9, and ends in synchronization with the end timing of the first period (High period) T1 of the output of the time ratio output means 9. The second driving signal T12 starts after a second latency period Td2 elapses since the end timing of the first period (High period) T1 of the output of the time ratio output means 9, and ends in synchronization with the end timing of the second period (Low period) T2 of the output of the time ratio output means 9. The driving means 6 drives the respective switching means based on the first driving signal T11 and the second driving signal T12. Herein, each of the first and second latency periods Td1 and Td2 is constant regardless of the High/Low ratio of the output of the time ratio output means 9.

The first and second latency periods Td1 and Td2 are added to the driving timings of the first and second switching means 3a and 3b, respectively, whereby the operation is on standby until a resonant voltage or current, which is applied when the first and second switching means 3a and 3b are ON or OFF, reaches a value suitable to switching. With such an arrangement, an increase of the loss in each switching means is suppressed, and the operation is prevented from going out of a safety operation range, so as not to break the switching means. For example, it is previously known that zero-volt switching is performed by keeping the first switching means 3a on while the voltage Vce1 between both ends of the first switching means 3a is decreased to zero so that a regenerative current flows through the diode FWDa. However, if the latency period Td1 is inappropriately short as shown by a one-dot chain line of part (d) of FIG. 6, the zero-volt switching of the first switching means 3a cannot be performed, and the voltage Vce1 results in the waveform shown in part (k) of FIG. 6. The current flowing through the first switching means 3a and the diode FWDa results in a short-circuit current as shown in part (j) of FIG. 6. In such a case, due to this short-circuit current, the switching loss of the first switching means 3a is increased, or the operation goes out of a safety operation range, resulting in breakage of the switching means.

Thus, the first and second switching means 3a and 3b are alternately driven at a constant frequency by increasing/decreasing the driving time ratio T11/T12 of the first and second switching means 3a and 3b according to the High/Low ratio of the output of the time ratio output means 9, whereby the heating power to heat the load pan 4 can be controlled.

As described above, according to this embodiment, the driving time ratio setting means 8 is formed by the time ratio output means 9, which performs digital processing and provides a single output which represents the time ratio, and the signal distribution means 10, which converts the output of the time ratio output means 9 into two output signals. With such a structure, the time ratio output means 9 can be incorporated in the microcomputer 11; the number of output terminals used in the microcomputer 11 and the number of externally-attached electronic components can be reduced; and the driving time ratio setting means 8 can be simplified, and the size thereof can be decreased. Since the number of charging/discharging circuits, each of which is formed by a capacitor and a resistance, and which are used for generating the first and second latency periods Td1 and Td2, is only two, factors which may cause a variation of the timing among input/output signals in respective sections are reduced. The driving time ratio T11/T12 of the first and second switching means 3a and 3b can hence be accurately controlled, and the heating power to heat the load pan 4 can also be accurately controlled.

It should be noted that the above effects are obtained not only from the structure of the inverter circuit 3 according to embodiment 5. The same effects can be obtained so long as the inverter alternately drives a plurality of switching means at a constant frequency, and continuously changes the heating power to heat a load by changing the driving time ratio for the switching means. In the above described example, an input control signal is an input current. However, the same effects can be obtained even when a voltage between both ends of the first switching means 3a or the second switching means 3b, or a current flowing through the inverter circuit 3 is controlled. The above effects are obtained not only in an induction-heating cooking device, but also in a heating cooking device having an inverter, such as a microwave oven or the like.

(Embodiment 6)

Embodiment 6 of the present invention is described below with reference to the drawings. FIG. 8 is a block diagram showing a structure of embodiment 6 of the present invention. FIG. 9 shows waveforms output from respective sections of the heating cooking device according to embodiment 6 of the present invention. In FIG. 8, like elements are indicated by like reference-numerals used in FIG. 1, and descriptions thereof are omitted.

The control circuit 15 includes: driving means 6 for driving the first switching means 3a and second switching means 3b; input current detection means 7 for detecting an input current to the inverter circuit 3; driving time ratio setting means 18 for outputting a timing signal which alternately drives the first switching means 3a and second switching means 3b at a constant frequency such that an output of the input current detection means 7 becomes a desired input current; a microcomputer 21 having storage means 21a, wherein programs and data are previously stored, and calculation means 21b for performing various calculation based on the programs; operation setting means 22 which is formed by a switch, and the like, for outputting a signal to the microcomputer 21 so as to change the operation of the inverter circuit 3; latency time change means 23 for outputting to the microcomputer 21 a signal for changing the value of a first latency period Td21 or a second latency period Td22; and zero point detection means 24 for detecting a zero cross point of the commercial power supply 1.

The driving time ratio setting means 18 includes a first time ratio output means 18a and a second time ratio output means 18b. The first time ratio output means 18a outputs a first time ratio signal 91 which is High during a first set time period T21 and Low during a period which is difference between a predetermined period T and the first set time period T21, as shown in part (a) of FIG. 9. The first time ratio output means 18a appropriately changes the High/Low ratio of the first time ratio signal 91 based on a program of the microcomputer 21.

The second time ratio output means 18b generates a second time ratio signal 92. The second time ratio signal 92 is High during a second time period T22 which is determined such that the sum of the first set time T21 output from the first time ratio output means 18a, the first and second latency periods Td21 and Td22 previously stored in the storage means 21a (in the case where these periods are changed by the latency time change means 23, values obtained after they have been changed), and the second time period T22 is equal to the predetermined period T. The second time ratio signal 92 is Low during a time period which is a sum of the first set time period T21 and the first and second latency periods Td21 and Td22 previously stored in the storage means 21a (in the case where these periods are changed by the latency time change means 23, values obtained after they have been changed). The second time ratio signal 92 becomes High after the second latency period Td22 previously stored in the storage means 21a (in the case where this period is changed by the latency time change means 23, a value obtained after it has been changed) elapses since the end timing of the first set time period T21.

The microcomputer 21 is a one chip microcomputer including a CPU, which includes the calculation means 21b, the storage section, such as a RAM, a ROM, or the like, and input/output terminals. The microcomputer 21 is molded by, for example, a resin or the like. The microcomputer 21 has a specific function of outputting a drive timing signal, which determines the driving time ratio between the first and second switching means 3a and 3b such that an output of the input current detection means 7 becomes a desired value set by the program, to the driving means 6 by the first time ratio output means 18a and the second time ratio output means 18b based on a program.

An operation of the above structure is described below. When a user activates the operation setting means 22 by, for example, depressing a switch of the operation setting means 22, the microcomputer 21 outputs a signal which allows the inverter circuit 3 to operate. The inverter circuit 3 rectifies a current from the commercial power supply 1 using the rectification circuit 2, and converts a direct current smoothed by the choke coil 3f and the smoothing capacitor 3e into a high frequency alternating current. The inverter circuit 3 allows the high frequency alternating current to flow through a resonant loop formed by the load coil 3c and the resonant capacitors 3d1 and 3d2, whereby an eddy current is generated in the load pan 4 which is magnetically coupled to the load coil 3c, and the load pan 4 is inductively heated with Joule heat generated due to the eddy current.

At this time, the microcomputer 21 receives an output of the latency time change means 23, and determines based on the value of the received output whether or not the first latency period Td21 or the second latency period Td22 previously stored in the ROM of the storage means 21a is changed, and if changed, determines which level the period Td21 or Td22 is changed to. Based on these determinations, the microcomputer 21 changes the first latency period Td21 or the second latency period Td22 previously stored in the ROM of the storage means 21a.

For example, as shown in FIG. 4, the latency time change means 23 is formed by two resistances R1 and R2. A voltage value obtained by dividing an operational power supply voltage Vdd of the control circuit 15 using the resistances R1 and R2 is input to an A/D input terminal (not shown) of the microcomputer 21. If this input value is 0 or Vdd, none of the first latency period Td21 and the second latency period Td22 are changed. If the input value is (⅕)Vdd or (⅖)Vdd, it is determined that the first latency period Td21 is changed from a current value stored in the ROM of the storage means 21a by +2 μs or −2 μs, respectively. If the input value is (⅗)Vdd or (⅘)Vdd, it is determined that the second latency period Td22 is changed from a current value stored in the ROM of the storage means 21a by +1 μs or −1 μs, respectively. This determination result is temporarily stored in the RAM. Of course, by setting change levels corresponding to a voltage value input to the microcomputer 21 with a higher resolution, the first latency period Td21 or the second latency period Td22 can be changed with a higher resolution. In this embodiment, the inverter circuit 3 has a structure shown in FIG. 8. The operations of the first and second switching means 3a and 3b are illustrated by the waveforms of parts (c) through (f) of FIG. 9.

Next, assuming the frequency of the commercial power supply 1 is 60 Hz, the microcomputer 21 detects a generally maximum input current to the inverter circuit 3 using the input current detection means 7 formed by a peak hold circuit, about 4 to 4.5 ms after the zero point detection means 24 detects a zero cross point of the commercial power supply 1. The first set time period T21 is set based on a program such that this value is equal to a desired value.

The microcomputer 21 uses a timer function for counting the first set time period T21 (High period) and a timer function for counting a time period (Low period), which is determined such that the sum of this time period and the first set time period T21 (High period) is equal to constant time period T or which corresponds to the constant time period T, so as to set the first time ratio signal 91 by the first time ratio output means 18a of the driving time ratio setting means 18 such that the first set time period T21 is High within the constant time period T as shown in part (a) of FIG. 9.

The microcomputer 21 reads from the ROM of the storage means 21a, or calculates in the calculation means 21b, the second set time period T22 such that the sum of the first set time period T21, the first and second latency periods Td21 and Td22, and the second set time period T22, is equal to the constant time period T as shown in part (b) of FIG. 9. In the case where the first latency period Td21 or the second latency period Td22 has been changed, the microcomputer 21 performs a calculation based on a changed value temporarily stored in the RAM, and uses a result of this calculation as the second set time period T22.

The microcomputer 21 uses a timer function for counting the second set time period T22 (High period), a timer function for counting a time period (Low period), which is determined such that the sum of this time period and the second set time period T22 (High period) is equal to constant time period T or which corresponds to the constant time period T, and a timer function for counting the second latency period Td22, so as to set the second time ratio signal 92 by the second time ratio output means 18b such that the signal 92 is High during the second set time period T22, and is Low during the period where the sum of this period and the second set time period T22 is equal to the constant time period T, as shown in part (b) of FIG. 9.

The first time ratio output means 18a outputs the set time ratio to the driving means 6 at a timing when the zero point detection means 24 detects a next zero cross point. The second time ratio output means 18b outputs the second time ratio signal 92 to the driving means 6 at a start of the second set time period T22, which occurs after the elapse of the second latency period Td22 since the end timing of the first set time period T21. The second latency period Td22 is read from the ROM of the storage means 21a, or if the second latency period Td22 has been changed, a result of a calculation performed by the calculation means 21b based on the second latency period Td22 stored in the ROM and a changed value temporarily stored in the RAM is used as the second latency period Td22.

About 4 to 4.5 ms after the time when the zero point detection means 24 detects a zero cross point of the commercial power supply 1 again, a generally maximum input current to the inverter circuit 3 is detected by the input current detection means 7. The driving time ratio setting means 18 determines the first set time period T21 and the second set time period T22 at a next zero cross point and outputs the determined values. In this way, the processing is performed every half period of the frequency of the commercial power supply 1, whereby the processing can be readily achieved by the calculation process capacity (1 machine cycle=0.125 to 0.25 μs) of a 4 bit- or 8 bit-microcomputer that operates at a clock frequency of 4 to 8 MHz, which is used for general purposes. As a result, a drive timing signal is supplied to the driving means 6, and the driving means 6 alternately drives the first and second switching means 3a and 3b according to the timing signal at a constant frequency based on the driving time ratio T21/T22.

As a result, the first and second latency periods Td21 and Td22, which are non-conduction periods of the first and second switching means 3a and 3b, are respectively added to the first and second set time periods T21 and T22, based on which the driving timing of the first and second switching means 3a and 3b are determined. With this arrangement, the operation is on standby until a resonant voltage or current, which is applied when the first and second switching means 3a and 3b are ON or OFF, reaches a value suitable to switching, whereby an increase of the loss in each switching means is suppressed, and the operation is prevented from going out of a safety operation range, so as not to break the switching means.

For example, it is previously known that zero-volt switching is performed by keeping the first switching means 3a on while the voltage Vce1 between both ends of the first switching means 3a is decreased to zero so that a regenerative current flows through the diode FWDa. However, if the first latency period Td21 is inappropriately short as shown by a one-dot chain line of part (a) of FIG. 9, the zero-volt switching of the first switching means 3a cannot be performed, and the voltage Vce1 results in the waveform shown in part (h) of FIG. 9. The current flowing through the first switching means 3a and the diode FWDa results in a short-circuit current as shown in part (g) of FIG. 9. In such a case, the switching loss of the first switching means 3a is increased, or the operation goes out of a safety operation range due to this short-circuit current, resulting in breakage of the switching means. Thus, the heating power to heat the load pan 4 can be controlled as described above.

As described above, according to embodiment 6, the driving time ratio setting means 18 is formed by the time ratio output means 18a and 18b which perform digital processing. Thus, the driving time ratio setting means 18 can be incorporated in the microcomputer 21. As a result, the number of components of the control circuit 15 can be reduced, and thus, the control circuit 15 can be simplified, and the size thereof can be decreased. Further, the control circuit 15 can be formed without including a charging/discharging circuit composed of a capacitor and a resistance. Therefore, factors which may cause a variation of the timing among input/output signals in respective sections can be reduced. The driving time ratio T21/T22 of the first and second switching means 3a and 3b can be accurately controlled, and the heating power to heat the load pan 4 can also be accurately controlled.

Even when a content of the ROM of the microcomputer 21 cannot be changed, for example, at a latter stage in development of a product, the first latency period Td21 or second latency period Td22 can be readily changed by changing the signal level of a signal externally supplied to the microcomputer 21. Further, the microcomputer 21 can receive a signal from the external latency time change means 23 at a predetermined timing, for example, when the inverter circuit 3 is inactive. Thus, an erroneous detection of an output value of the external latency time change means 23, which may be caused due to an influence of noise generated from the inverter circuit 3, such as switching noise of the first and second switching means 3a and 3b, or the like, can be prevented. The output value of the external latency time change means 23 is detected in a reliable manner, and the process of changing the first and second latency periods Td21 and Td22 can be accurately performed.

It should be noted that the above effects are obtained not only from the structure of the inverter circuit 3 according to embodiment 6. The same effects can be obtained so long as the inverter alternately drives a plurality of switching means at a constant frequency, and continuously changes the heating power to heat a load by changing the driving time ratio for the switching means. In the above described example, an input control signal is an input current. However, the same effects can be obtained even when an input control signal is a voltage between both ends of the first switching means 3a or the second switching means 3b, or a current flowing through the inverter circuit 3. The above effects can be obtained not only in an induction-heating cooking device, but also in a heating cooking device having an inverter, such as a microwave oven or the like.

Furthermore, setting of the outputs of the first and second time ratio output means is performed at every zero-point timing detected by the zero point detection means 24 (every half period of the frequency of the commercial power supply 1). However, as a matter of course, the same effects can be obtained even when the setting is not performed at every zero-point timing. For example, the same effects can be obtained even when the setting is performed at a frequency equal to or higher than one period of the frequency of the commercial power supply 1 so long as, for example, in the case where an input current is controlled, a shut-off of a circuit breaker is not caused by a large variation of an input current under control, or a cooking performance is not influenced by an excessive variation of the heating power.

INDUSTRIAL APPLICABILITY

As described above, according to the present invention, there is provided an effect of providing a highly reliable induction-heating cooking device wherein: an influence of induced electromotive force due to a magnetic flux generated by a heating coil on a wiring portion is suppressed; and a variation in the brightness of display means, erroneous lighting of the display means, and breakage of an element can be prevented.

Further, according to the present invention, there is provided an effect of providing a highly reliable induction-heating cooking device wherein: display means is electrically conducted through a plurality of wiring lines; the output of output control means is divided and output through multiple wiring lines, which include a wiring line for indicating a portion to be heated by the heating coil, and a wiring line for displaying control information from output control means, so that the amount of noise superposed on the wiring line is dispersed: and display can be performed while a variation in the brightness of display means, erroneous lighting of the display means, and breakage of an element are prevented.

Furthermore, according to the present invention, the display means is structured so as to be powered through a plurality of power supply lines. Thus, there is provided an effect of realizing a highly reliable induction-heating cooking device wherein: the display means not only indicates a portion to be heated by the heating coil but also displays control information from the output control section; in the case where a large electric power is consumed by an output of the display means, electric power can be supplied from another power supply line; and even when a trouble occurs in one power supply line, display can be achieved using another power supply line.

Furthermore, according to the present invention, the display means is structured so as to be powered through a plurality of power supply lines, and powered through one power supply line by a trans-coupling to the heating coil. Thus, there is provided an effect of realizing a highly reliable induction-heating cooking device wherein: large electric power can be supplied to the display means according to an output of the heating coil; and even when a trouble occurs in one power supply line, display can be achieved using another power supply line.

Furthermore, according to the present invention, there can be provided a heating cooking device having an inverter, wherein: in driving time ratio setting means which operates at a constant frequency, the range of processing which can be achieved by an integrated circuit, such as a microcomputer, is extended, and a portion formed by other components is minimized, so that the degree of integration is increased, whereby the driving time ratio setting means is simplified and the size thereof is decreased.

Further still, according to the present invention, driving time ratio setting means can be formed by first and second time ratio setting means which performs digital calculation processing, and thus, the driving time ratio setting means can be readily realized by an integrated circuit. Thus, there can be provided a heating cooking device having an inverter, wherein: an increase of the loss in switching means is suppressed, and the operation is prevented from going out of a safety operation range, so as not to break the switching means; and the control circuit is simplified and the size thereof is decreased.

What is claimed is:

1. An induction-heating cooking device, comprising:
   an insulating plate which is partially or entirely light-transmissive, and on which an object to be heated is placed;

an induction heating coil provided under the insulating plate, for heating the object to be heated;

display means for indicating a portion to be heated by the induction heating coil through the insulating plate;

and output control means for controlling electrical conduction to the induction heating coil, wherein the display means includes light emitting means which is provided in the vicinity of a magnetic flux generated by the induction heating coil and which indicates a portion to be heated by the induction heating coil, and a loop formed by wirings to the light emitting means is laid so as to radially extend along a radial direction of the induction heating coil.

2. An induction-heating cooking device according to claim 1, wherein:

the light emitting means is connected by a plurality of wiring lines;

at least one of the wiring lines indicates a portion to be heated by the induction heating coil as an output of the display means; and at least one of the wiring lines displays control information from the output control means.

3. An induction-heating cooking device, comprising:

an insulating plate which is partially or entirely light-transmissive, and on which an object to be heated is placed;

an induction heating coil provided under the insulating plate, for heating the object to be heated;

display means for indicating a portion to be heated by the induction heating coil through the insulating plate; and output control means for controlling electrical conduction to the induction heating coil, wherein the display means includes light emitting means, and the light emitting means is laid and connected so as to be powered from a plurality of power supply lines, an output of the display means indicates a portion to be heated by the induction heating coil, and displays controls information from the output control means.

4. An induction-heating cooking device according to claim 3, wherein at least one of the plurality of power supply lines is formed by a power supply to which electric power is supplied by a trans-coupling to the induction heating coil.

5. An induction-heating cooking device, comprising:

an insulating plate which is partially or entirely light-transmissive, and on which an object to be heated is placed;

an induction heating coil provided under the insulating plate, for heating the object to be heated;

a display means for indicating a portion to be heated by the induction heating coil through the insulating plate;

and an output control means for controlling electrical conduction to the induction heating coil, wherein the display means includes light emitting means, and the light emitting means is laid and connected so as to be powered from a plurality of power supply lines, an output of the display means indicates a portion to be heated by the induction heating coil, and displays control information from the output control means, and wherein a loop formed by wiring to the light emitting means is laid so as to radially extend along a radial direction of the induction heating coil.

6. An induction heating cooking device according to claim 5, wherein at least one of the plurality of power supply lines is formed by a power supply to which electric power is supplied by a trans-coupling to the induction heating coil.

* * * * *